United States Patent Office 3,320,309
Patented May 16, 1967

3,320,309
PROCESS FOR PREPARING CARBODIIMIDES
Paul Schlack, Leitershofen, near Augsburg, and Günter Keil, Lorsbach, Taunus, Germany, assignors to Farbwerke Hoechst Aktiengesellschaft vormals Meister Lucius & Bruning, Frankfurt am Main, Germany, a corporation of Germany
No Drawing. Filed Oct. 8, 1963, Ser. No. 314,608
Claims priority, application Germany, Oct. 13, 1962, F 38,042
10 Claims. (Cl. 260—551)

This invention relates to a process for preparing carbodiimides.

Carbodiimides have recently achieved increasing importance as condensing agents. Thus, for example, carbodiimides are useful in the preparation of peptides from amino acids or esters from acids and alcohols. In such preparations, the carbodiimides have the function of binding the water formed during the reaction while bringing about the formation of urea linkages. In addition, carbodiimides have utility in the after-treatment of textile fibers, e.g., prior to dyeing with acid dyestuffs, and as cross-linking agents for polymeric substances.

It has heretofore been proposed to prepare carbodiimides by splitting off hydrogen sulfide from thioureas with the aid of heavy metal oxides or with hypochlorites. Due to the addition of water to the carbodiimides, ureas are formed as by-products in nearly all instances in such syntheses.

We have found that aliphatic carbodiimides are obtainable, without the formation of urea as a by-product, by heating a thiourea with an alkali metal amide, an alkali metal hydride or an alkali metal alcoholate in an inert solvent to an elevated temperature. The reaction proceeds in the following manner:

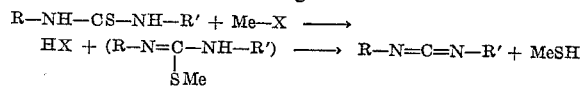

in which R and R' are the same or different lower tertiary alkyl or cycloalkyl radicals, Me is an alkali metal, preferably sodium or potassium, and X is hydrogen, $NH_2$ or an alcoholate group, e.g., O-lower alkyl.

Potassium and sodium compounds are preferably used as the alkali metal compounds represented by Me—X, the sodium compounds, e.g., sodium amide and sodium hydride, being particularly useful because of their low cost and ready economical availability. The alcoholates that are generally useful are the compounds of sodium or potassium with alcohol that do not disturb the course of the reaction due to steric reasons. These include sodium-tert. butylate, potassium-tert. butylate and sodium isopropylate.

Inert solvents that are suitable for use in the reaction include aromatic hydrocarbons such as benzene, toluene, decahydronaphthalene, chlorobenzene and anisol. To facilitate destruction of excessive amounts of alkali metal compounds by addition of water, it is preferable to use solvents that are miscible with water, e.g., dioxane or tetrahydrofuran. It is also generally most desirable to use solvents having a boiling point of at least about 100° C.

Optimum results are obtainable particularly by reaction of aliphatic thioureas with sodium hydride in boiling dioxane. Even carbodiimides that are difficult to obtain by other methods are obtainable in good to very good yields by following this procedure.

The use of sodium amide, as the alkali metal compound reactant, is recommended only for the production of stable, symmetrical carbodiimides. Among the alcoholates that are suitable, those of secondary or tertiary alcohols are most useful. For example, sodium-tert. butylate is particularly desirable because, due to its steric blocking effect, an addition to the carbodiimides is not encountered. Furthermore, it is advantageous permanently to remove tert. butanol that is formed in the reaction with benzene or toluene from the reaction medium in the form of an azeotropic mixture. Alkali metal isopropylates can be used in a similar manner, but alkali metal methylates are useful only in instances in which the carbodiimide itself is sterically blocked to a high degree, for instance, by two tertiary carbon atoms.

The following examples are intended to illustrate the invention but are not to be construed as limiting the scope of the invention:

Example 1

10.0 grams of dicyclohexyl-thiourea, 2.0 grams of sodium amide (industrial) and 80 cc. of dry toluene are boiled for 4 hours under reflux. The reaction mixture is allowed to cool, it is stirred up with active alumina, filtered, and the filtrate is concentrated. 5.2 grams of crude carbodiimide are obtained. The distillation gives rise to the formation of 3.9 grams (45% of the theory) of dicyclohexyl-carbodiimide boiling at 123–126° C. under a pressure of 0.7 mm. of mercury.

Example 2

7.3 grams of N-cyclohexyl-N'-(t-butyl)-thiourea and 1.8 grams of sodium amide (industrial) are boiled in 80 cc. of dry toluene for three and a half hours under reflux. The mixture is allowed to cool, active alumina is added, it is filtered and concentrated. A weakly yellow oil is obtained which contains 0.3 gram of dicyclohexyl-thiourea (melting point 183° C.). When distilling the oil at a boiling point of 126°–128° C. under a pressure of 27 mm. of mercury, there are obtained 4.0 grams (65% of the theory) of N-cyclohexyl-N'-(t-butyl)-carbodiimide.

Example 3

12.0 grams of dicyclohexyl-thiourea and 8.0 grams of sodium-t-butylate (66% of $NaOC(CH_3)_3$) are boiled for four hours in dry toluene at the descending cooler, whereby an azeotropic mixture of toluene and butanol distils off. The toluene that has distilled off is permanently replaced. The mixture is allowed to cool, a small amount of active alumina is added to the mixture which is filtered and concentrated. 4.6 grams (45% of the theory) of crude carbodiimide are obtained. By distillation (boiling point 125–130° C. under a pressure of 1 mm. of mercury) the dicyclohexyl-carbodiimide is obtained in the form of colorless leaflets.

Example 4

12 grams of dicyclohexyl-thiourea, 8 grams of sodium isopropylate and 100 cc. of dry toluene are boiled at the descending cooler for four and a half hours. An azeotropic mixture of toluene and isopropanol distils off. The toluene eliminated by distillation is permanently replaced. The mixture is filtered and the toluene phase is concentrated. 8.7 grams of crude carbodiimide are obtained. By distillation (boiling point 136–139° C. under a pressure of 3–4 mm. of mercury) 5.0 grams (48.5% of the theory) of pure dicyclohexyl-carbodiimide are obtained.

Example 5

12 grams of dicyclohexyl-thiourea and 2.8 grams of sodium hydride (industrial; containing 86.4% of NaH) are boiled for 1 hour under reflux in 80 cc. of dry dioxane and in an atmosphere of nitrogen. The cooled solution is poured into ice-water, extracted with ether, the ether solution is additionally washed with water, dried and concentrated. 8.5 grams of crude carbodiimide are obtained in the form of a light yellow oil. By distillation (boiling point 124–126° C. under a pressure of 0.5 mm. of mercury) 7.2 grams (70% of the theory) of pure dicyclohexyl-carbodiimide are obtained.

*Example 6*

21.4 grams of N-cyclohexyl-N'-(t-butyl)-thiourea and 4.2 grams of sodium hydride (86.4% of NaH) are boiled for 1 hour under reflux in 120 cc. of dry dioxane and in an atmosphere of nitrogen. The cooled solution is poured into ice-water. The carbodiimide that has separated is extracted with ether and worked up as described in Example 5. 16.7 grams of the crude product are obtained. Subsequent distillation delivers 12.9 grams (72% of the theory) of pure N-cyclohexyl-N'-(t-butyl)-carbodiimide boiling at 150–154° C. under a pressure of 50 mm. of mercury.

We claim:

1. A process for the manufacture of carbodiimides which comprises heating a thiourea of the formula

NHR—CS—NHR' in which R and R' are lower tertiary alkyl or cyclohexyl with an alkali metal amide, an alkali metal hydride or an alkali metal secondary or tertiary alcoholate of three to four carbon atoms, in an inert organic solvent to about the reflux temperature of said solvent, and removing any secondary or tertiary alcohol, formed in the process, in the form of an azeotropic mixture.

2. A process as claimed in claim 1, wherein sodium tert.-butylate is used as alkali metal alcoholate.

3. A process as claimed in claim 1, wherein potassium tert.butylate is used as alkali metal alcoholate.

4. A process as claimed in claim 1, wherein sodium hydride is used as alkali metal hydride and dioxane is used as inert organic solvent.

5. A process as claimed in claim 1, wheren dicyclohexyl-thiourea is used as thiourea.

6. A process as claimed in claim 1, wherein N-cyclohexyl-N'-(t-butyl)-thiourea is used as thiourea.

7. A process as defined in claim 1 wherein the alkali metal compounds are sodium or potassium compounds.

8. A process as defined in claim 1 wherein the inert organic solvent is benzene, toluene, decahydronaphthalene, chlorobenzene, anisol, dioxane or tetrahydrofuran.

9. A process as defined in claim 1 wherein the inert organic solvent is miscible with water.

10. A process as defined in claim 1 wherein the thiourea is symmetrical and the alkali metal reactant is sodium amide.

No references cited.

WALTER A. MODANCE, *Primary Examiner.*

H. I. MOATZ, *Assistant Examiner.*